US012587368B2

(12) United States Patent
He et al.

(10) Patent No.: US 12,587,368 B2
(45) Date of Patent: Mar. 24, 2026

(54) METHOD, APPARATUS, DEVICE AND STORAGE MEDIUM FOR DATA PROCESSING

(71) Applicant: Beijing Volcano Engine Technology Co., Ltd., Beijing (CN)

(72) Inventors: Peixuan He, Beijing (CN); Lu Yan, Beijing (CN); Yao Zhang, Beijing (CN); Ye Wu, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/104,658

(22) PCT Filed: Jun. 6, 2024

(86) PCT No.: PCT/CN2024/097880
§ 371 (c)(1),
(2) Date: Feb. 18, 2025

(87) PCT Pub. No.: WO2024/251219
PCT Pub. Date: Dec. 12, 2024

(65) Prior Publication Data
US 2026/0012332 A1 Jan. 8, 2026

(30) Foreign Application Priority Data
Jun. 9, 2023 (CN) .......................... 202310687091.X

(51) Int. Cl.
*H04L 9/08* (2006.01)
(52) U.S. Cl.
CPC ................................. *H04L 9/0825* (2013.01)

(58) Field of Classification Search
CPC ................................. H04L 9/0825; H04L 9/08
See application file for complete search history.

(56) References Cited

U.S. PATENT DOCUMENTS 12,282,540 B1 * 4/2025 Chandrashekar ....... G06F 21/57
2017/0161505 A1 6/2017 Campagna et al.
(Continued)

FOREIGN PATENT DOCUMENTS

CN 102271124 A 12/2011
CN 103795717 A 5/2014
(Continued)

OTHER PUBLICATIONS

Office Action for Chinese Patent Application No. 202310687091.X, mailed on Jun. 25, 2024, 11 pages.
(Continued)

*Primary Examiner* — Quazi Farooqui
(74) *Attorney, Agent, or Firm* — Astute IP Law Group

(57) ABSTRACT
The embodiment of this disclosure provides a method, an apparatus, a device and a computer readable storage medium for data processing based on a trusted execution environment. The method includes: a host device determines, based on a first parameter set, a first metric value for describing a target virtual machine hosted on the host device. The host device sends the first metric value to a client device via a trusted execution environment component of the host device. Next, the host device receives, from the client device via the trusted execution environment component, a decryption key for decrypting a first virtual image file of the target virtual machine; and runs, based on the decryption key, the first virtual image file to start the target virtual machine. Thereby, a user may implement a data processing system based on a trusted execution environment.

19 Claims, 7 Drawing Sheets

(56)                    References Cited

U.S. PATENT DOCUMENTS

| | | | |
|---|---|---|---|
| 2019/0155728 A1* | 5/2019 | Ferguson | ............. H04L 63/062 |
| 2023/0128099 A1 | 4/2023 | Nunez Mencias et al. | |

FOREIGN PATENT DOCUMENTS

| | | |
|---|---|---|
| CN | 109634619 A | 4/2019 |
| CN | 109844748 A | 6/2019 |
| CN | 114296873 A | 4/2022 |
| CN | 114327791 A | 4/2022 |
| CN | 114647487 A | 6/2022 |
| CN | 115348077 A | 11/2022 |
| CN | 115640571 A | 1/2023 |
| CN | 115795511 A | 3/2023 |
| CN | 115801446 A | 3/2023 |
| CN | 116680687 A | 9/2023 |
| JP | 2022099293 A | 7/2022 |

OTHER PUBLICATIONS

International Search Report and Written Opinion for PCT/CN2024/097880, mailed on Sep. 2, 2024, 15 pages.
Notice of Allowance for Chinese Patent Application No. 202310687091.X, mailed on Sep. 6, 2024, 8 pages.
Office Action for Chinese Patent Application No. 202310687091.X, mailed on Mar. 20, 2024, 31 pages.
Office Action for Japanese Patent Application No. 2025-508667, mailed on Sep. 16, 2025, 6 pages.

* cited by examiner

400

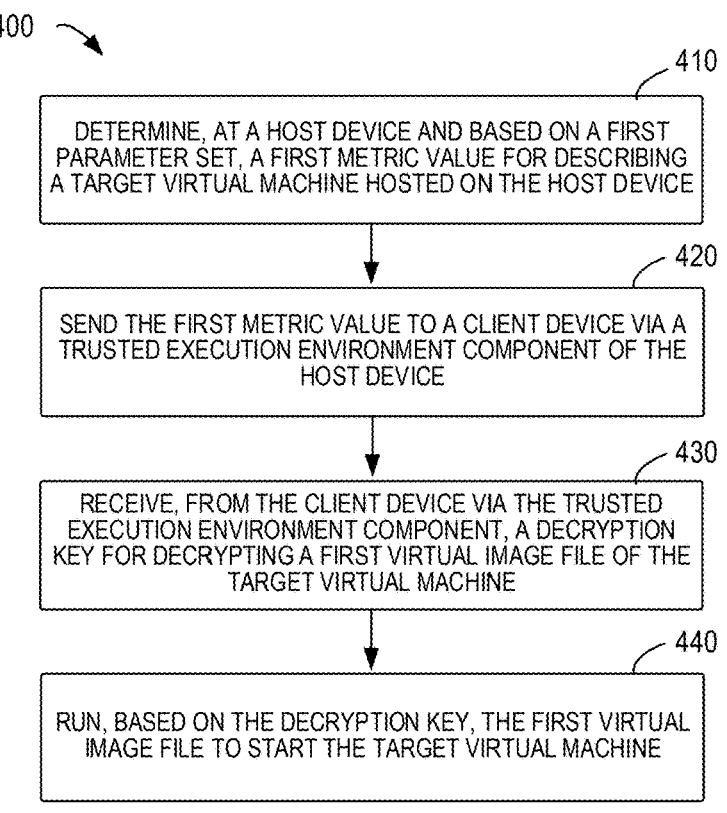

410

DETERMINE, AT A HOST DEVICE AND BASED ON A FIRST PARAMETER SET, A FIRST METRIC VALUE FOR DESCRIBING A TARGET VIRTUAL MACHINE HOSTED ON THE HOST DEVICE

420

SEND THE FIRST METRIC VALUE TO A CLIENT DEVICE VIA A TRUSTED EXECUTION ENVIRONMENT COMPONENT OF THE HOST DEVICE

430

RECEIVE, FROM THE CLIENT DEVICE VIA THE TRUSTED EXECUTION ENVIRONMENT COMPONENT, A DECRYPTION KEY FOR DECRYPTING A FIRST VIRTUAL IMAGE FILE OF THE TARGET VIRTUAL MACHINE

440

RUN, BASED ON THE DECRYPTION KEY, THE FIRST VIRTUAL IMAGE FILE TO START THE TARGET VIRTUAL MACHINE

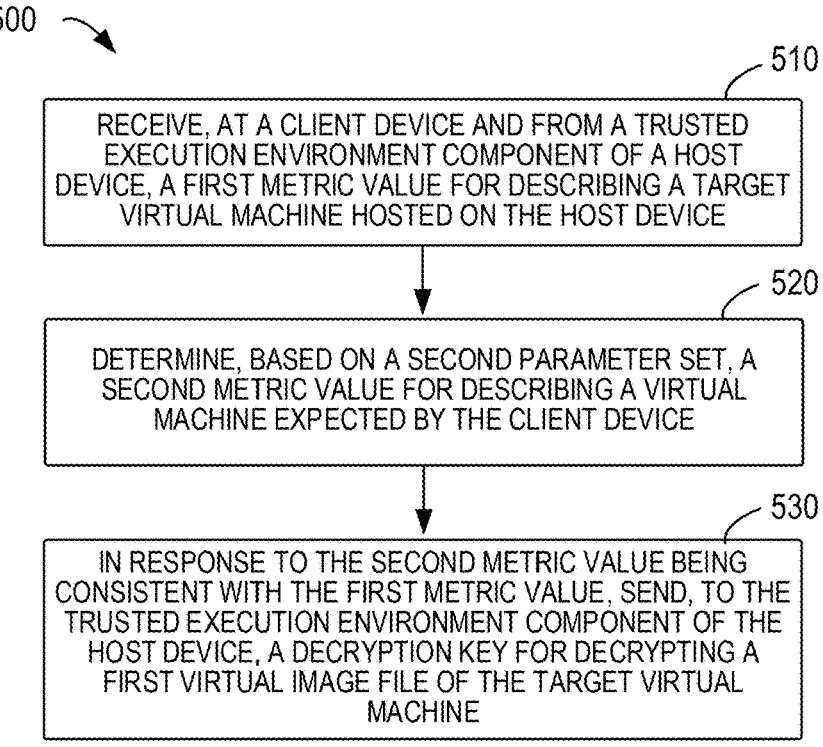

510

RECEIVE, AT A CLIENT DEVICE AND FROM A TRUSTED EXECUTION ENVIRONMENT COMPONENT OF A HOST DEVICE, A FIRST METRIC VALUE FOR DESCRIBING A TARGET VIRTUAL MACHINE HOSTED ON THE HOST DEVICE

520

DETERMINE, BASED ON A SECOND PARAMETER SET, A SECOND METRIC VALUE FOR DESCRIBING A VIRTUAL MACHINE EXPECTED BY THE CLIENT DEVICE

530

IN RESPONSE TO THE SECOND METRIC VALUE BEING CONSISTENT WITH THE FIRST METRIC VALUE, SEND, TO THE TRUSTED EXECUTION ENVIRONMENT COMPONENT OF THE HOST DEVICE, A DECRYPTION KEY FOR DECRYPTING A FIRST VIRTUAL IMAGE FILE OF THE TARGET VIRTUAL MACHINE

FIRST METRIC VALUE RECEIVING MODULE — 710

SECOND METRIC VALUE GENERATING MODULE — 720

DECRYPTION KEY SENDING MODULE — 730

800

PROCESSING UNIT — 810

STORAGE DEVICE — 830

MEMORY — 820

825 — PROGRAM PRODUCT

COMMUNICATION UNIT — 840

INPUT DEVICE — 850

OUTPUT DEVICE — 860

METHOD, APPARATUS, DEVICE AND STORAGE MEDIUM FOR DATA PROCESSING

CROSS REFERENCE TO RELATED APPLICATION

This application is a U.S. national stage application of International Patent Application PCT/CN2024/097880, filed on Jun. 6, 2024, which claims the benefit of Chinese Patent Application No. 202310687091X, entitled "METHOD, APPARATUS, DEVICE AND STORAGE MEDIUM FOR DATA PROCESSING", filed on Jun. 9, 2023, the contents of which are incorporated herein by reference in their entireties.

FIELD

Example embodiments of the present disclosure generally relate to the field of computers, and in particular, to a method, an apparatus, a device and a computer readable storage medium for data processing based on a trusted execution environment.

BACKGROUND

With the development of cloud technologies, more and more individuals, enterprises and organizations tend to upload their own data to the cloud for management. However, constructing a safe and reliable cloud environment requires professional technicians and high software and hardware costs, so these individuals, enterprises and organizations usually implement data management through a cloud environment provided by third-party companies. However, the cloud environment provided by third-party companies is not trusted. In this case, how to implement secure and reliable data management in a third-party cloud environment is a technical problem that needs to be solved currently.

SUMMARY

In a first aspect of the present disclosure, there is provided a data processing method based on a trusted execution environment, comprising: determining, at a host device and based on a first parameter set, a first metric value for describing a target virtual machine hosted on the host device; sending the first metric value to a client device via a trusted execution environment component of the host device; receiving, from the client device via the trusted execution environment component, a decryption key for decrypting a first virtual image file of the target virtual machine; and running, based on the decryption key, the first virtual image file to start the target virtual machine.

In a second aspect of the present disclosure, there is provided a further data processing method based on a trusted execution environment, comprising: receiving, at a client device and from a trusted execution environment component of a host device, a first metric value for describing a target virtual machine hosted on the host device; determining, based on a second parameter set, a second metric value for describing a virtual machine expected by the client device; and in response to the second metric value being consistent with the first metric value, sending, to the trusted execution environment component of the host device, a decryption key for decrypting a first virtual image file of the target virtual machine.

In a third aspect of the present disclosure, there is provided a data processing apparatus based on a trusted execution environment, comprising: a first metric value generating module, configured to: determine, based on a first parameter set, a first metric value for describing a target virtual machine hosted on a host device; a first metric value sending module, configured to send the first metric value to a client device via a trusted execution environment component of the host device; a decryption key receiving module, configured to receive, from the client device via the trusted execution environment component, a decryption key for decrypting a first virtual image file of the target virtual machine; and a first virtual image running module, configured to run, based on the decryption key, the first virtual image file to start the target virtual machine.

In a fourth aspect of the present disclosure, there is provided a further data processing apparatus based on a trusted execution environment, comprising: a first metric value receiving module, configured to receive, from a trusted execution environment component of a host device, a first metric value for describing a target virtual machine hosted on the host device; a second metric value generating module, configured to determine, based on a second parameter set, a second metric value for describing a virtual machine expected by a client device; and a decryption key sending module, configured to, in response to the second metric value being consistent with the first metric value, sending, to the trusted execution environment component of the host device, a decryption key for decrypting a first virtual image file of the target virtual machine.

In a fifth aspect of the present disclosure, an electronic device is provided. The device includes: at least one processing unit; and at least one memory coupled to the at least one processing unit and storing instructions for execution by the at least one processing unit, the instructions, when executed by the at least one processing unit, causing the electronic device to perform the method of the first aspect or the second aspect.

In a sixth aspect of the present disclosure, a computer-readable storage medium is provided. The computer-readable storage medium has a computer program stored thereon, and the computer program is executable by the processor to implement the method of the first aspect or the second aspect.

It should be understood that the content described in this summary section is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein:

FIG. 4 illustrates a flowchart of a data processing process performed by a host device according to some embodiments of the present disclosure;

FIG. 5 illustrates a flowchart of a data processing process performed by a client device according to some embodiments of the present disclosure;

DETAILED DESCRIPTION

Figure 1A:
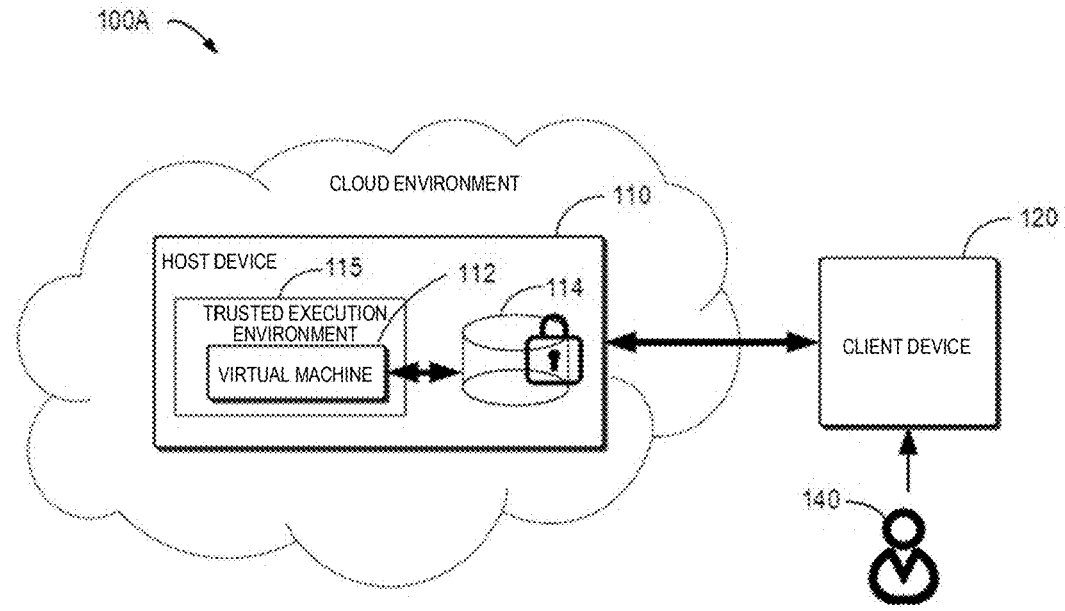
FIGS. 1A and 1B illustrate schematic diagrams of example environments in which embodiments of the present disclosure can be implemented.

Embodiments of the disclosure will be described in more detail below with reference to the accompanying drawings. While certain embodiments of the disclosure are shown in the accompanying drawings, it should be understood that the disclosure may be implemented in various forms and should not be construed as limited to the embodiments set forth herein, but rather, these embodiments are provided for a more thorough and complete understanding of the disclosure. It should be understood that the drawings and embodiments of the disclosure are for exemplary purposes only and are not intended to limit the scope of the disclosure.

In the description of the embodiments of the disclosure, the terms "comprising", "including" and the like should be understood to open-ended, i.e., "including but not limited to". The term "based on" should be understood as "based at least in part on". The terms "one embodiment" or "the embodiment" should be understood as "at least one embodiment". The term "some embodiments" should be understood as "at least some embodiments". Other explicit and implicit definitions may also be included below.

Herein, unless explicitly stated, "in response to A" performing one step does not imply that this step is performed immediately after "A", but may include one or more intermediate steps.

It may be understood that the data involved in the technical solution (including but not limited to the data itself, the obtaining or using of the data) should follow the requirements of the corresponding laws and regulations and related rules.

It may be understood that before using the technical solutions disclosed in the embodiments of the disclosure, the user should be informed of the types, use ranges, usage scenario, and the like of the personal information related to the present disclosure in an appropriate manner according to relevant laws and regulations and the authorization of the user may be obtained.

For example, in response to receiving an active request from a user, prompt information is sent to the user to explicitly prompt the user that the requested operations to be performed would require acquisition and use of personal information of the user, such that the user may autonomously select whether to provide personal information to software or hardware such as an electronic device, an application, a server, or a storage medium that performs the operations of the technical solution of the disclosure, according to the prompt information.

As an optional but non-limiting implementation, in response to receiving an active request from a user, a manner of sending prompt information to the user may be, for example, a pop-up window, and the pop-up window may present the prompt information in a text manner. In addition, the pop-up window may further carry a selection control for the user to select "agree" or "disagree" to provide personal information to the electronic device.

It may be understood that the foregoing process of notifying and acquiring user authorization is merely illustrative, and does not constitute a limitation on the implementations of the disclosure, and other manners that meet related laws and regulations may also be applied to the implementations of the disclosure.

As discussed above, as cloud technologies evolve, more and more individuals, businesses, and organizations tend to upload their own data to the cloud for management. However, constructing a safe and reliable cloud environment requires professional technicians and high software and hardware costs, so these individuals, enterprises and organizations usually implement data management through a cloud environment provided by third-party companies. In this case, since the cloud environment provided by the third-party company is not an entirely trusted environment, when the data management is implemented through the cloud environment provided by the third-party company, there may be a risk of being leaked.

In view of this, how to implement secure and reliable data management in a third-party cloud environment is a technical problem that needs to be resolved currently.

Embodiments of the present disclosure provide a data processing solution based on trusted execution environments. According to this aspect, the host device determines a first metric value based on the first parameter set, wherein the first metric value is configured to describe a target virtual machine hosted on the host device. The host device sends the first metric value to the client device via the trusted execution environment component. Next, the host device receives a decryption key for decrypting the first virtual image file of the target virtual machine from the client device via the trusted execution environment component, and runs the first virtual image file to start the target virtual machine based on the decryption key.

Thereby, the security of the data processing environment is improved by using the trusted execution environment and the encrypted virtual image file.

Example Environment

FIG. 1A illustrates a schematic diagram of an example environment 100A in which embodiments of the present disclosure can be implemented. As shown in FIG. 1A, the example environment 100A may include a host device 110 and a client device 120 of a user 140.

As shown in FIG. 1A, host device 110 may be deployed with a trusted execution environment 115. In the trusted execution environment 115, a virtual machine 112 may be run, and the virtual machine 112 may be referred to as a target virtual machine 112 or a to-be-started virtual machine 112. With virtual machines running in trusted execution environment 115, client device 120 may implement data management, i.e., manage and maintain data 114. Embodiments of the present disclosure are not limited in this respect.

In some embodiments, the client device 120 communicates with the host device 110 to implement data management. The client device 120 may be any type of mobile terminal, fixed terminal, or portable terminal, including a mobile handset, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a pointing device, a television receiver, a radio broadcast receiver, an e-book device, a gaming device, or any combination of the foregoing, including accessories and peripherals of these devices, or any combination thereof. In some embodiments, the client device 120 can also support any type of interface for a user (such as a "wearable" circuit, etc.).

The host device 110 may be a standalone physical server, a server cluster composed of multiple physical servers, or a distributed system, or may be a cloud server that provides basic cloud computing services such as cloud services, cloud databases, cloud computing, cloud functions, cloud storage, network services, cloud communications, middleware services, domain name services, security services, content distribution networks, and big data and artificial intelligence platforms. Host device 110 may include, for example, a computing system/server, such as a mainframe, an edge computing node, a computing device in a cloud environment, or the like. The host device 110 may provide the client device 120 with a background service that provides data management. One example of the host device 110 is a host machine of a cloud vendor.

A communication connection may be established between the host device 110 and the client device 120. The communication connection may be established in a wired manner or a wireless manner. Communication connections may include, but are not limited to, Bluetooth connections, mobile network connections, universal serial bus connections, wireless fidelity connections, etc., embodiments of the present disclosure are not limited in this respect. In an embodiment of the present disclosure, the host device 110 and the client device 120 may implement signaling interaction by using a communication connection between the host device 110 and the client device 120.

Figure 1B:
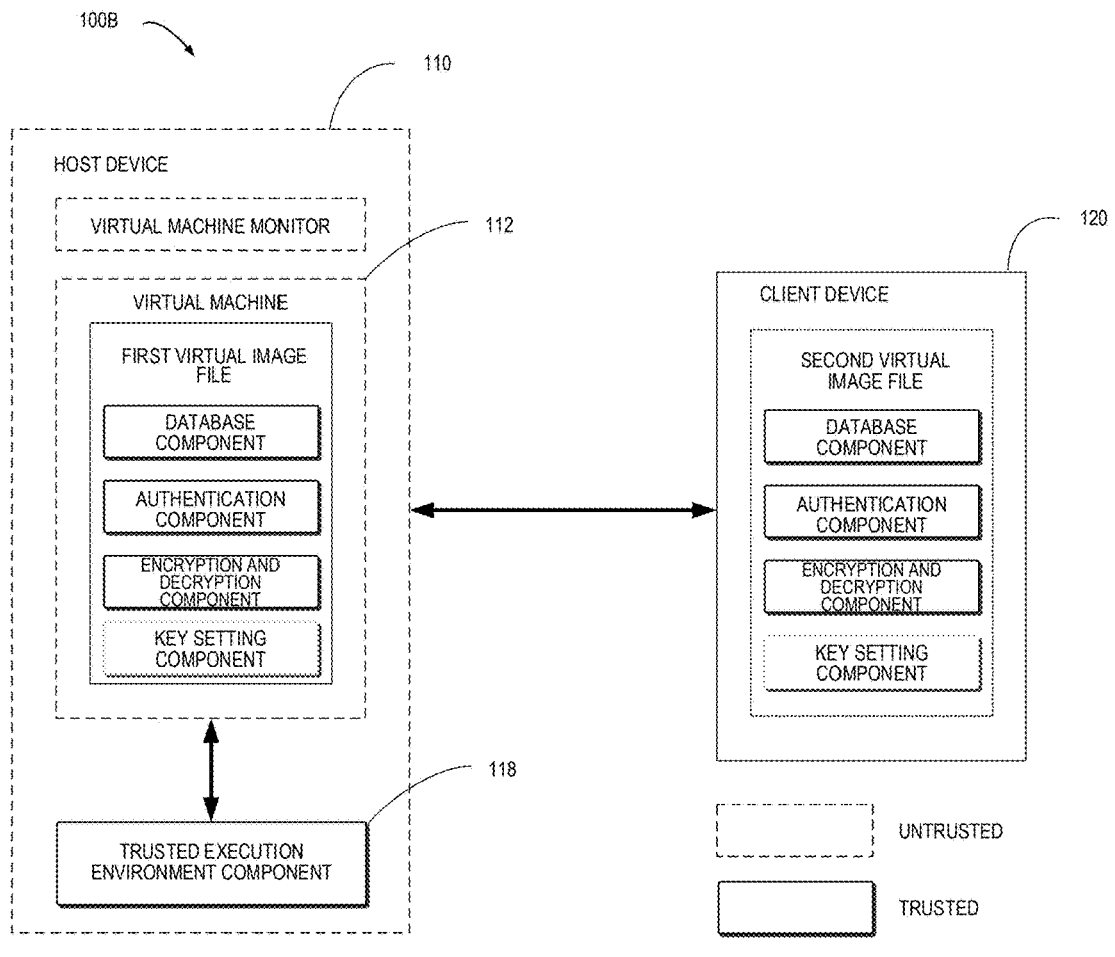

In order to achieve secure data management, the host device 110 and the client device may be deployed with corresponding software and hardware configurations. FIG. 1B illustrates a schematic diagram of a further example environment 100B in which embodiments of the present disclosure can be implemented. For ease of discussion, the environment 100B will be described with reference to the environment 100A of FIG. 1A.

In the specific embodiment of FIG. 1B, host device 110 includes a virtual machine monitor for managing virtual machines running on host device 110. Further, the host device 110 and the client device 120 include a first virtual image file and a second virtual image file, respectively. Virtual image files are sometimes also referred to as virtual machine images or virtual machine image programs.

In some embodiments, the first/second virtual image file may include a database component. Further, in some embodiments, the database component may be selected based on the needs of the user 140 and the application scenario, for example, the database component may be a database type focusing on analysis or a database type focusing on data management.

In some embodiments, the database component may include a database engine. The database engine may be any existing or future developed database engine, which may be a user-customized database engine or a general-purpose database engine. The present disclosure is not limited in this respect.

In some embodiments, the first/second virtual image file may further include an authentication component, configured to provide a remote attestation service, including but not limited to verifying a reliability of the trusted execution environment and negotiating a session key.

In some embodiments, the first/second virtual image file may further include an encryption and decryption component, for example, configured to encrypt a processing result of the virtual machine 112 and a message generated by the virtual machine 112, and decrypt a message received from the client device 120.

In some embodiments, the first/second virtual image file may further optionally include a key setting component. In aid of the key setting component, the user 140 may set various keys for communication between the host device 110 and the client device 120 and modify keys for encrypting the virtual machine 112, including symmetric keys and asymmetric keys.

In addition, although not shown, the first/second virtual image file may further include other components, for example, a key storage component for storing a key such as a signed public-private key pair $sk_s$, $pk_s$ and an encrypted public-private key pair $sk_e$, $pk_e$.

In the specific embodiment of FIG. 1B, host device 110 may include a trusted execution environment component 118. In some embodiments, the trusted execution environment component 118 may implement a virtual machine level trusted execution environment.

It should be understood that the structures and functions of the various elements in the environments 100A and 100B are described for exemplary purposes only, and do not imply any limitation to the scope of the present disclosure. In other words, the structure, function, number, and linking relationship of the elements in the environments 100A and 100B may be changed according to actual needs. The present disclosure is not limited in this respect.

Example Process

Figure 2:
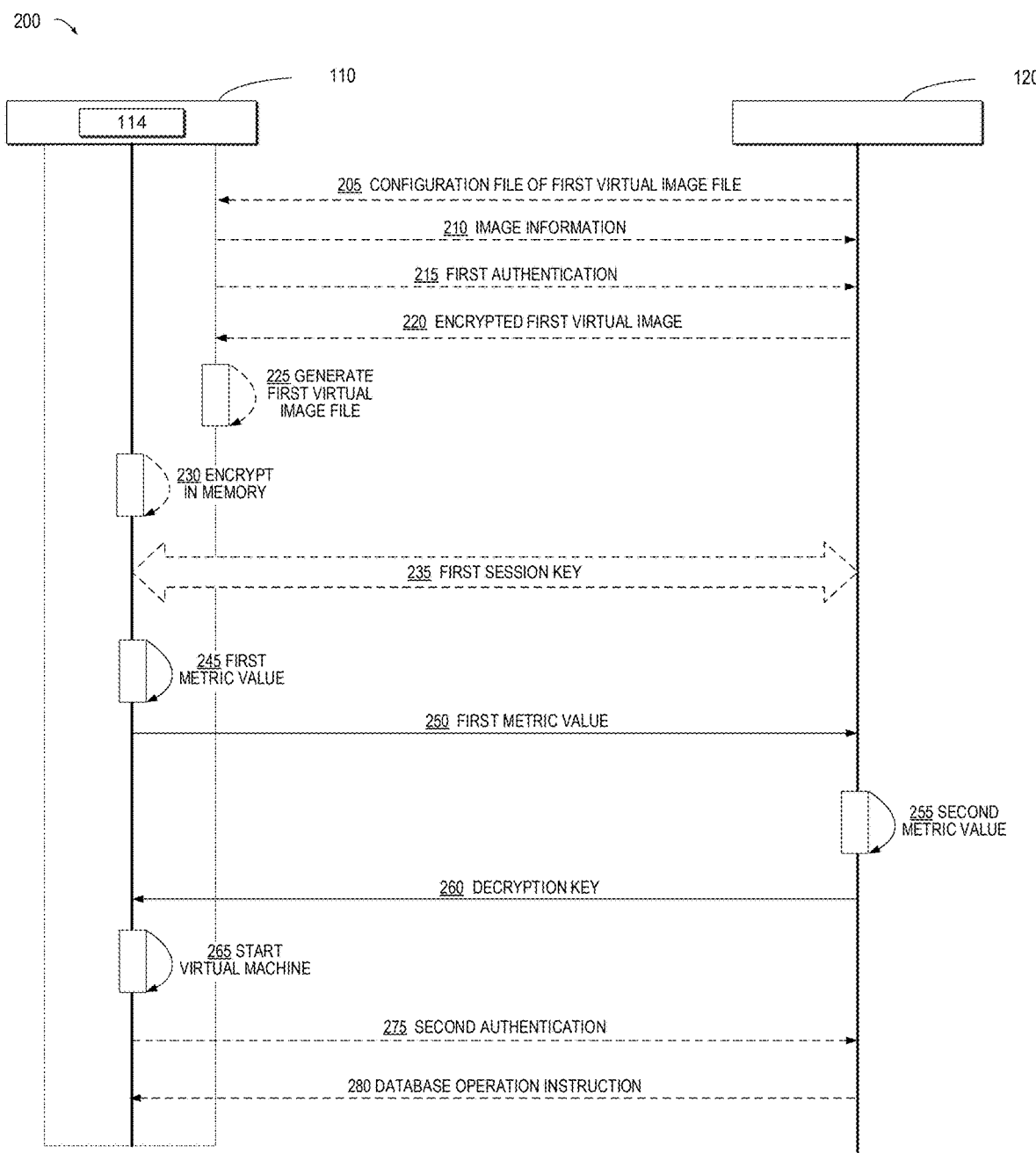
FIG. 2 illustrates a signaling interaction diagram of a data processing method according to some embodiments of the present disclosure.

FIG. 2 illustrates a signaling interaction diagram 200 of a data processing method according to some embodiments of the present disclosure. For ease of discussion, process 200 will be described with reference to environment 100A of FIG. 1A and environment 100B of FIG. 1B, e.g., by using host device 110 and client device 120.

According to some embodiments of the present disclosure, the security of data management may be improved by deploying a secure data processing environment and improving the security of data transmission and usage, thereby implementing a full ciphertext database system, and thus ensuring a secure data transmission process, a secure data usage process, and a secure data storage process.

Next, how to deploy a secure data processing environment and how to utilize the deployed data processing environment to implement secure data storage, transmission, and processing will be discussed in detail.

In operation, the host device 110 generates 245 a first metric value based on the first parameter set and sends 250 the first metric value to the client device 120 via the trusted execution environment component 118, where the first metric value is configured to describe the target virtual machine 112 hosted on the host device 110.

For the client device 120, after receiving the first metric value, the client device 120 determines 255 a second metric value based on the second parameter set, where the second metric value is configured to describe the virtual machine expected by the client device 120.

Next, if the second metric value determined by the client device 120 is consistent with the received first metric value, a decryption key for decrypting the first virtual image file of the target virtual machine 112 is sent 260 to the trusted execution environment component 118 of the host device 110. Accordingly, the trusted execution environment component 118 of the host device 110 may run the first virtual image file to start the target virtual machine 112 based on the decryption key.

In this way, the virtual machine 112 running on the host device 110 may be double protected by the decryption key set by the user 140 and the trusted execution environment component 118 deployed on the host device 110, and the security of the data processing environment can be improved.

Further, to ensure that the first metric value may better describe the target virtual machine 112 hosted on the host device 110, the first parameter set may include a plurality of parameters strongly related to the target virtual machine 112. One example parameter is a first parameter associated with the host device 110. Another example parameter is a second parameter associated with the first virtual image file. Yet another example parameter is a third parameter associated with user information of the client device 120.

It should be understood that the above example parameters are for illustrative purposes only. In other embodiments, other example parameters may be employed, the disclosure is not limited in this respect.

It should be understood that the second parameter set used by the client device 120 to generate the second metric value should correspond to the first parameter set. In other words, the parameters included in the first parameter set and the second parameter set should be corresponding, and the included parameters should be known in advance by the host device 110 and the client device 120. Thus, the second parameter set may include a plurality of parameters corresponding to the first parameter set that are strongly correlated with the virtual machine expected by the client device 120. In some embodiments, the second parameter set may accordingly include at least one of a first parameter associated with the host device 110, a second parameter associated with the first virtual image file, and a third parameter associated with user information of the client device 120.

In some embodiments, the first virtual image file may include at least one component configured to be automatically run in response to the start of the target virtual machine 112. Example component includes, but is not limited to, a database component, an authentication component, an encryption and decryption component, and a key setting component.

In some embodiments, for security considerations, once the virtual machine 112 starts, the user 140 is prohibited from operating the virtual machine 112 in any way except via the virtual image file.

Generally, different trusted execution environments differ for requirements on hardware, such as cores, processors, and the like. In view of this, in some embodiments, a hardware configuration, such as a corresponding kernel version, that supports the trusted execution environment 118 needs to be configured at the host device 110.

Different deployment manners may be used based on different trust degrees of the user 140 for the host device 110. In some application scenarios, the trust degree of the user 140 for the host device 110 is low, in which case the first virtual image file running at the host device 110 may be generated by the user 140 itself. Specifically, the client device 120 generates a first virtual image file, encrypts the first virtual image file by using an encryption technology, and the example encryption technology may be a Linux-based hard disk encryption or full disk encryption technology. Next, the client device 120 may send 220 the encrypted first virtual image file to the host device 110.

Alternatively, in some application scenarios, the user 140 at least partially trusts the host device 110. In this case, the user 140 may generate 225 the first virtual image file using a component pre-configured by the host device 110, or may generate the first virtual image file using a virtual image file template pre-configured by the host device 110. In this case, the client device 120 first generates a configuration file for generating the first virtual image file, and sends 205 the configuration file to the host device 110. The configuration file may indicate software and hardware configuration information or a corresponding virtual image file template required to generate the first virtual image file. Based on the configuration file, the host device 110 may generate a first virtual image file. Further, after generating the first virtual image file, the host device 110 may send the generated first virtual image file information 210 to the client device, so that the client device 120 knows the execution status of the configuration file.

Additionally, in some embodiments, to ensure security of the decryption key transmission. Before transmitting the decryption key, the session key may be pre-negotiated 235 between the client device 120 and the host device 110. Specifically, the host device 110 negotiates the first session key with the client device 120 via the trusted execution environment component 118. Next, when the decryption key is transmitted, the decryption key may be encrypted using the first session key. In this way, the security of the decryption key transmission is improved.

Additionally, in the initial interaction phase, the host device 110 may send 215 first authentication information for authenticating the host device 110 to the client device 120. An example of the first authentication information may be a certificate chain, where a root certificate of the certificate chain may be a hardware vendor of the device, and an end certificate of the certificate chain may be a certificate generated in advance on behalf of the host device 110. Further, in some embodiments, the first authentication information includes a public key of the host device 110 used in communicating with the host device 110.

In some embodiments, the first authentication information may include a public key of the host device 110 for negotiating the first session key with the client device 120. In other words, the authentication process of the host device 110 may be tied together with the transmission of the public key of the host device 110. In this case, after completing the authentication of the host device 110, the client device 120 may obtain the public key of the host device 110, thereby improving the security and credibility of the public key transmission of the host device 110.

According to some embodiments of the present disclosure, in order to further improve the security of the to-be-started and to-be-operated virtual machine 112, the host device 110 may encrypt 230 the first virtual image file in the memory via the trusted execution environment component 118.

Figure 3A:
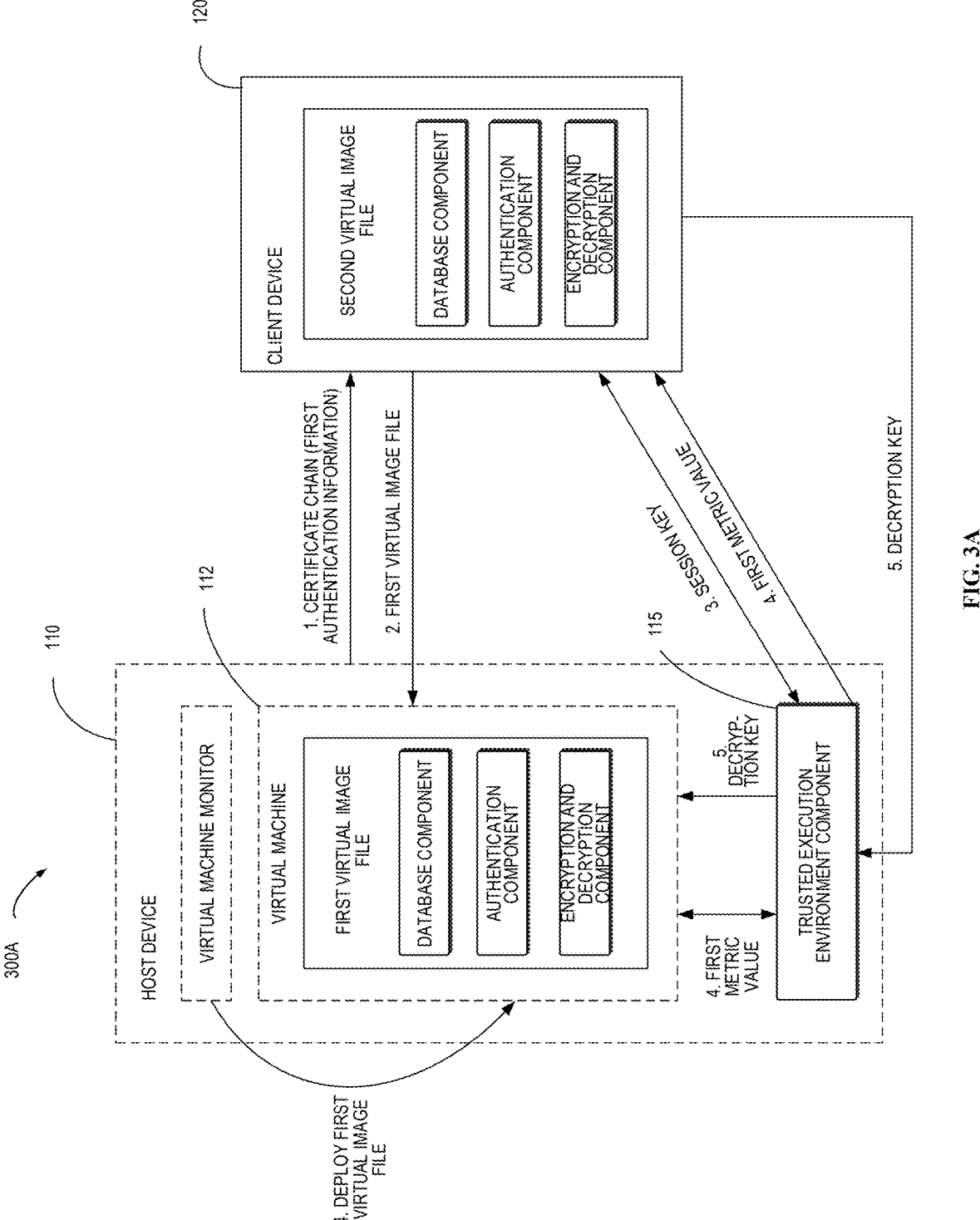
FIGS. 3A and 3B illustrate block diagrams of data processing methods according to some embodiments of the present disclosure.
Figure 3B:
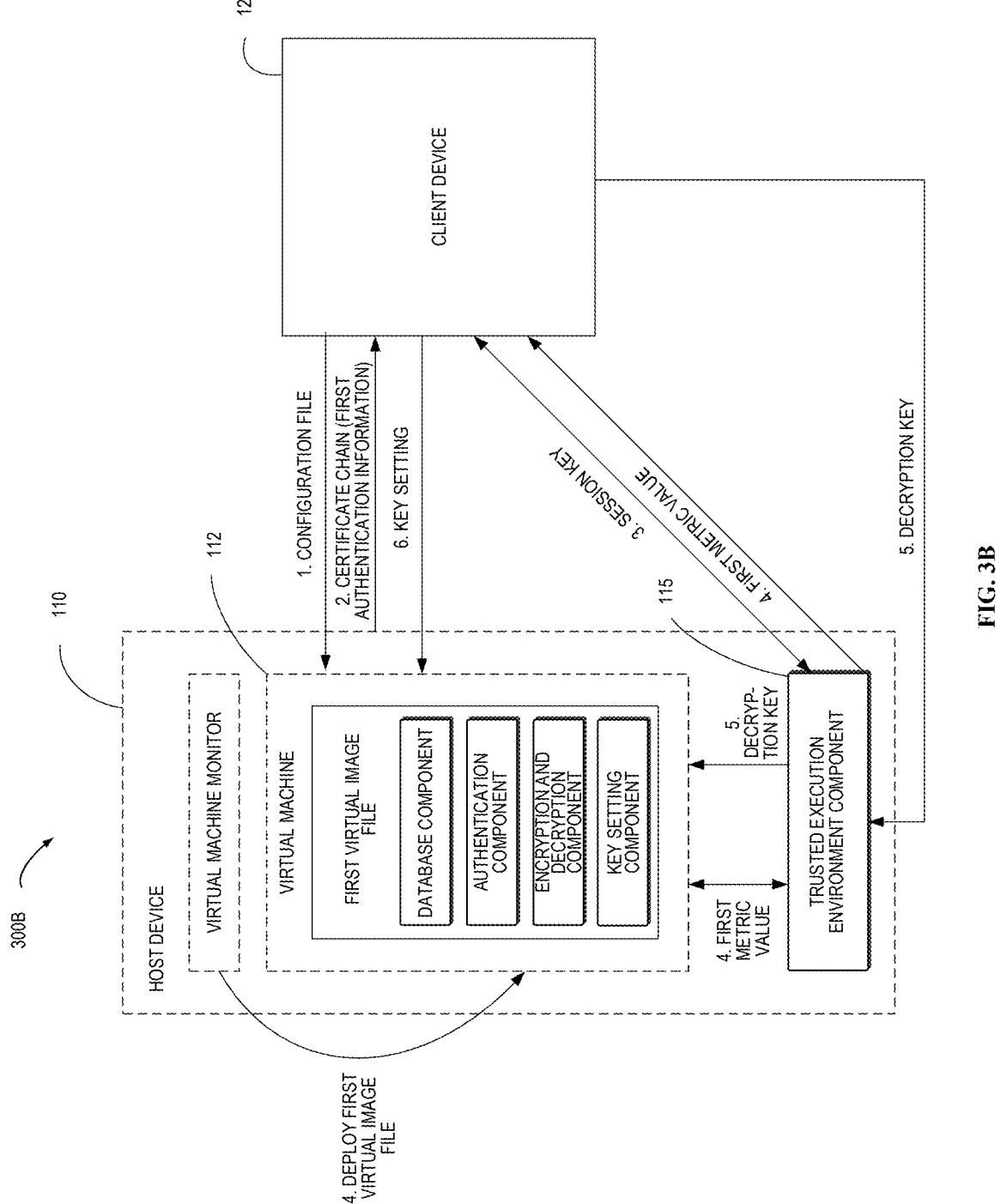

In order to better understand the deployment process of the data processing environment, the deployment process of the data processing environment will be further described in conjunction with FIGS. 3A and 3B.

FIGS. 3A and 3B show block diagrams 300A and 300B of data processing methods according to some embodiments of the present disclosure. For ease of discussion, FIGS. 3A and 3B will be described with reference to environment 100A of FIG. 1A and environment 100B of FIG. 1B, e.g., by using host device 110 and client device 120.

In FIG. 3A, the client device 120 obtains, from the cloud vendor, first authentication information, such as a certificate chain, to be used to authenticate the host device 110. The client device 120 verifies the correctness of the first authentication information. If the client device 120 confirms that the first authentication information is correct, the encrypted first virtual image file is sent to the host device 110, where the encrypted first virtual image file requires a decryption key for decryption.

In some embodiments, the client device 120 may perform key negotiation with the trusted execution environment component 118 to negotiate the first session key sk and initiate a request to start the virtual machine 112. Additionally, the first session key sk may be negotiated based on a Diffie-Hellman key exchange mechanism.

In some embodiments, the host device 110 deploys the encrypted first virtual image file and encrypts the first virtual image file in memory by the trusted execution environment component 118.

Further, the trusted execution environment component 118 of the host device 110 generates and sends a first metric value $mr_1$, sometimes referred to as a start metric value, to the host device 110.

In some embodiments, the generation of the first metric value $mr_1$ is related to the deployed trusted execution environment 115/trusted execution environment component 118, that is, the first metric value $mr_1$ generated by the different trusted execution environment 115/trusted execution environment component 118 is different. In some embodiments, the first metric value $mr_1$ is related to the following information: a first parameter associated with the host device 110 (such as configuration information of the platform), a second parameter associated with the first virtual image file (such as information of the first virtual image), and a third parameter associated with the user information of the client device 120. It should be understood that the first metric value $mr_1$ may be determined based on any suitable parameter or rule, which is not limited in this respect.

The client device 120 may locally obtain the corresponding parameters to obtain a second metric value $mr_2$, also referred to as a desired start metric value $mr_2$. Example parameters for generating the second metric value $mr_2$, for example, include a first parameter associated with the host device 110 (such as configuration information of the platform), a second parameter associated with the first virtual image file (such as information of the first virtual image), and a third parameter associated with user information of the client device 120.

The client device 120 compares the second metric value $mr_2$ with $mr_1$ sent from the host device 110, and if they are consistent, sends the decryption key secret to the host device 110.

In some embodiments, the host device 110 and the client device 120 may negotiate the first session key sk. In some embodiments, the host device 110 encrypts the decryption key secret with the first session key sk, i.e., Enc(sk, secret), and sends the encrypted decryption key to the host device 110.

The host device 110 receives the encrypted decryption key and obtain the decryption key secret through decryption with the first session key sk. Based on the decryption key secret, the received first virtual image file may be decrypted. Further, the trusted execution environment component 118 of the host device 110 may start the first virtual image file in the encrypted memory. Because the first virtual image file includes at least one component that is enabled to be started automatically, when the virtual machine 112 is started, the client device 120 may use various components deployed in the virtual machine 112, such as a database component, an authentication component, an encryption and decryption component, and a key setting component.

Reference is further made to FIG. 3B. In the embodiment of FIG. 3B, the client device 120 selects a configuration file associated with the virtual image file (such as a kernel version, a database engine, an encryption/decryption algorithm, etc.) provided by a provider of the host device 110. The host device 110 generates a corresponding full-disk encryption image, that is, an encrypted first virtual image file, according to the configuration file of the client device 120. In some embodiments, the full disk encryption image key of the first virtual image file (i.e., the decryption key used to decrypt the first virtual image file) is randomly generated by the cloud vendor corresponding to the host device 110. In some embodiments, the first virtual image file generated by the host device 110 includes a key setting component to facilitate subsequent modification of the decryption key for decrypting the first virtual image file by the user 140.

Next, the client device 120 obtains first authentication information, such as a certificate chain, from the host device 110. Further, with the first authentication information, the host device 110 also provides information related to the generated first virtual image file to the client device 120.

The client device 120 verifies the correctness of the first authentication information. In some embodiments, if the client device 120 confirms that the first authentication information is correct, the client device 120 may perform key negotiation with the trusted execution environment component 118 to negotiate the first session key sk and initiate a request to start the virtual machine 112. Additionally, the first session key sk may be negotiated based on a Diffie-Hellman key exchange mechanism.

In some embodiments, the host device 110 deploys the encrypted first virtual image file and encrypts the first virtual image file in memory by the trusted execution environment component 118.

Further, the trusted execution environment component 118 of the host device 110 determines a first metric value $mr_1$ and sends it to the host device 110. In some embodiments, the generation of the first metric value $mr_1$ is related to the deployed trusted execution environment 115/trusted execution environment component 118, that is, the first metric value generated by the different trusted execution environment 115/trusted execution environment component 118 is different. In some embodiments, the first metric value $mr_1$ is related to the following information: a first parameter associated with the host device 110 (such as configuration information of the platform), a second parameter associated with the first virtual image file (such as information of the first virtual image), and a third parameter associated with the user information of the client device 120. It should be understood that the first metric value $mr_1$ may be determined based on any suitable parameter or rule, which is not limited in this respect. It should be understood that the first metric value $mr_1$ may be determined based on any suitable parameter or rule, which is not limited in this respect.

The client device 120 may locally obtain the corresponding parameters to obtain a second metric value $mr_2$, also referred to as a desired start metric value $mr_2$. Example parameters for generating the second metric value $mr_2$, for example, include a first parameter associated with the host device 110 (such as configuration information of the platform), a second parameter associated with the first virtual image file (such as information of the first virtual image), and a third parameter associated with user information of the client device 120.

The client device 120 compares the second metric value $mr_2$ with $mr_1$ sent from the host device 110, and if they are consistent, sends the decryption key secret to the host device 110.

In some embodiments, the host device 110 and the client device 120 may negotiate the first session key sk. In some embodiments, the host device 110 encrypts the decryption key secret with the first session key sk, i.e., Enc(sk, secret), and sends the encrypted decryption key to the host device 110.

The host device 110 receives the encrypted decryption key and obtain the decryption key secret through decryption with the first session key sk. Based on the decryption key secret, the received first virtual image file may be decrypted. Further, the trusted execution environment component 118 of the host device 110 may start the first virtual image file in the encrypted memory. Because the first virtual image file includes at least one component that is enabled to be started automatically, when the virtual machine 112 is started, the client device 120 may use various components deployed in the virtual machine 112, such as a database component, an authentication component, an encryption and decryption component, and a key setting component.

In some embodiments, since the first virtual image file includes at least one component that is enabled to be started automatically, the client device 120 may first modify the full disk secret key of the virtual machine 112 through the key setting service in the virtual machine 112, and further set the signature public-private key pair $sk_s$, $pk_s$, and encrypt the public-private key pair $sk_e$, $pk_e$.

Through the above process, the trusted execution environment component 118 of the host device 110 may start 265 the virtual machine 112, whereby a more secure data processing environment can be deployed at the host device 110. Next, the user 140 may implement data management in a more secure manner.

As shown in FIG. 2, the trusted execution environment component 118 of the host device 110 may send 275 second authentication information for authenticating the trusted execution environment to the client device, where the second authentication information includes at least one key pair used to encrypt and decrypt database operation instructions of the client device 120. Based on the received at least one key pair, the client device 280 may send the encrypted database operation instruction to the host device 110.

For ease of understanding, how to execute database operation instructions is further described in connection with the following example operations.

In some embodiments, the user 140 completes the identity authentication through a user management system of the client device 120. Further, the user 140 verifies, by using the authentication component in the client device 120, whether the virtual machine 112 environment running the database component in the cloud environment is trusted.

As a specific implementation, the user 140 sends a random number nonce to the virtual machine 112. The authentication component inside the virtual machine 112 generates second authentication information, also referred to as trusted environment verification data. Along with the second authentication information, the host device 110 sends the encrypted public key $pk_e$, the signed public key $pk_s$, and the random number (i.e., Sig($sk_s$, nonce)) signed with the signed private key $sk_s$ to the client device 120.

In some embodiments, the second authentication information includes a signed public key $pk_s$ and an encrypted public key $pk_e$. In this way, it can be ensured that the public key value in the postback information is bound to the trusted execution environment. That is, when the trusted execution environment is verified, the public key information transmitted with the trusted execution environment is also considered to be trusted. In some embodiments, the signed public key $pk_s$, the encrypted public key $pk_e$ may be transmitted as a report data field in the second authentication information.

If the client device 120 verifies that the second authentication information is correct, it is verified whether Sig($sk_s$, nonce) is authorized. If the verification is passed, the user 140 may use the virtual machine 112 at ease.

In some embodiments, the user 140 sends database operation instruction via the client device 120. In a specific embodiment, the permission control module of the client device 120 first determines whether it has the permission to operate corresponding data, such as a table, a library, or the like. If not, it will be discarded directly. Otherwise, the client device 120 encrypts the database operation instruction and sends it to the virtual machine 112 via the trusted environment execution component 118.

In some embodiments, the database operation instruction is transmitted in a double encryption manner, that is, Enc($pk_e$, ssk), Enc(ssk, database operation instruction), where ssk is the session key selected randomly, $pk_e$ is an encrypted public key.

For the host device 110, after receiving the request, the database operation instruction is decrypted first, and then the database operation instruction is transmitted to the database component of the virtual machine 112 for database operation. The virtual machine 112 runs the operation library instruction and sends the operation result result to the user.

Correspondingly, to ensure the security of the data, the operation result result may also be encrypted and then sent to the client device 120, that is, Enc(ssk, result), where ssk is a randomly selected session key. The client device 120 obtains the data processing result result through decryption with the session key ssk.

It can be seen from the foregoing process that the decryption key of the user 140 is required for obtaining the data included in the virtual image file. In other words, before the first virtual image file is loaded into the memory, all the data including the application and the like are protected by using the image encryption key of the user equipment. Further, after the first virtual image file is loaded into the memory, all data operations of the first virtual image file are performed via the trusted execution environment component. In addition, the data is encrypted in the transmission process, and the key pair used for encryption and decryption is transmitted along with the authentication information of the trusted execution environment. Therefore, regardless of whether data is in a disk or a memory, and regardless of whether data is in transmission or processing, the data is protected with a corresponding security measure. In other words, the security of the data is ensured at each stage of its lifecycle.

In aid of the above-described process, through the virtual machine level trusted execution environment, the present disclosure achieves a deployment of a safe and reliable data processing environment in a cloud environment. Compared with a software-based implementation scheme, both the data processing performance and the system safety are improved. In addition, in this environment, neither installation of a trusted execution environment component nor modification of an existing database component is needed at the user side, thereby the deployment cost of the data processing system is reduced.

Example Methods

FIG. 4 illustrates a flowchart of a data processing process 400 according to some embodiments of the present disclosure. For ease of discussion, discussion is made with reference to the environments 100A and 100B of FIGS. 1A and 1B. The image processing process 400 may be implemented at the host device 110.

At block 410, the host device determines, based on a first parameter set, a first metric value for describing a target virtual machine hosted on the host device.

At block 420, the host device sends the first metric value to a client device via a trusted execution environment component of the host device.

At block 430, the host device receives, from the client device via the trusted execution environment component, a decryption key for decrypting a first virtual image file of the target virtual machine.

At block 440, the host device runs, based on the decryption key, the first virtual image file to start the target virtual machine.

In some embodiments, the first parameter set comprises at least one of the following: a first parameter associated with the host device, a second parameter associated with the first virtual image file, or a third parameter associated with user information of the client device.

In some embodiments, the host device negotiates, via the trusted execution environment component, a first session key with the client device, wherein the decryption key is encrypted with the first session key.

In some embodiments, the host device sends, to the client device, first authentication information for authenticating the host device, the first authentication information comprising a public key of the host device for communication with the host device.

In some embodiments, the host device may send, to the client device, first authentication information for authenticating the host device, the first authentication information comprising a public key of the host device for negotiating the first session key with the client device.

In some embodiments, the host device encrypts the first virtual image file in a memory via the trusted execution environment component.

In some embodiments, the host device receives, from the client device, a configuration file for generating the first virtual image file; and generates the first virtual image file based on the configuration file.

In some embodiments, the host device receives the encrypted first virtual image file from the client device.

In some embodiments, the first virtual image file comprises at least one component configured to be automatically run in response to a start of the target virtual machine, the at least one component comprising at least one of the following: a database component, an authentication component, an encryption and decryption component, and a key setting component.

In some embodiments, after the target virtual machine is started, the host device sends, to the client device via the trusted execution environment component, second authentication information for authenticating the trusted execution environment, wherein the second authentication information comprises at least one key pair for encrypting and decrypting a database operation instruction of the client device.

FIG. 5 illustrates a flowchart of a data processing process 500 according to some embodiments of the present disclosure. For ease of discussion, discussion is made with reference to the environments 100A and 100B of FIGS. 1A and 1B. The image processing process 500 may be implemented at the client device 120.

At block 510, the client device receives, from a trusted execution environment component of a host device, a first metric value for describing a target virtual machine hosted on the host device.

At block 520, the client device determines, based on a second parameter set, a second metric value for describing a virtual machine expected by the client device.

At block 530, in response to the second metric value being consistent with the first metric value, the client device sends, to the trusted execution environment component of the host device, a decryption key for decrypting a first virtual image file of the target virtual machine.

In some embodiments, the client device receives, from the host device, first authentication information for authenticating the host device, the first authentication information comprising a public key of the host device for communication with the host device.

In some embodiments, the client device may receive, from the host device, first authentication information for authenticating the host device, the first authentication information comprising a public key of the host device for negotiating the first session key with the client device.

In some embodiments, the second parameter set includes at least one of the following: a first parameter associated with the host device, a second parameter associated with the first virtual image file, or a third parameter associated with user information of the client device.

In some embodiments, the client device negotiates the first session key with a trusted execution environment component of the host device, wherein the decryption key is encrypted with the first session key.

In some embodiments, the client device sends, to the host device, a configuration file for generating the first virtual image file, and generates, at the client device, a first virtual image file corresponding to the configuration file.

In some embodiments, the client device sends the encrypted virtual image file to the host device.

In some embodiments, after the target virtual machine is started, the client device receives, from the trusted execution environment component of the host device, second authentication information for authenticating the trusted execution environment, wherein the second authentication information comprises at least one key pair for encrypting and decrypting a data base operation instruction of the client device.

Example Apparatus and Apparatus

Figures 6, 7:
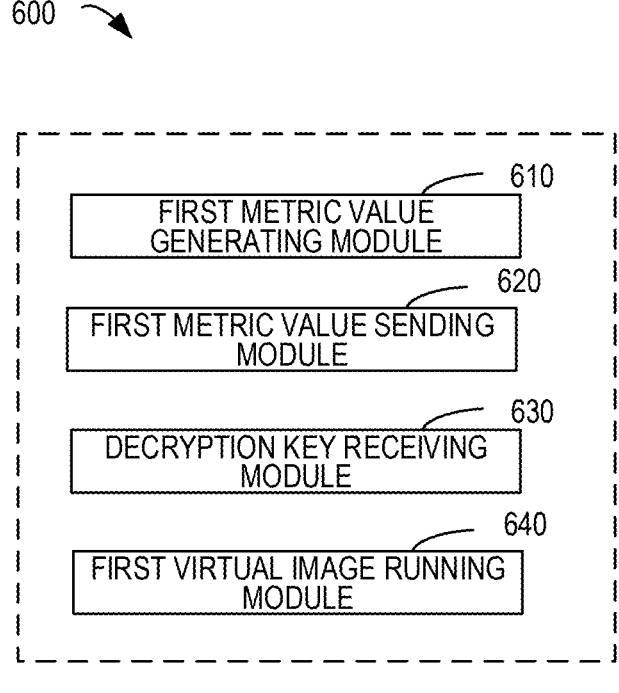
FIG. 6 is a schematic structural block diagram of a data processing apparatus according to some embodiments of the present disclosure.
FIG. 7 is a schematic structural block diagram of a further data processing apparatus according to some embodiments of the present disclosure.

FIG. 6 is a schematic structural block diagram of a data processing apparatus 600 according to some embodiments of the present disclosure. The apparatus 600 may be implemented as or included in the host device 110. The various modules/components in the apparatus 600 may be implemented by hardware, software, firmware, or any combination thereof.

As shown in FIG. 6, the apparatus 600 includes: a first metric value generating module 610, configured to: determine, based on a first parameter set, a first metric value for describing a target virtual machine hosted on a host device;

a first metric value sending module 620, configured to send the first metric value to a client device via a trusted execution environment component of the host device; a decryption key receiving module 630, configured to receive, from the client device via the trusted execution environment component, a decryption key for decrypting a first virtual image file of the target virtual machine; and a first virtual image running module 640, configured to run, based on the decryption key, the first virtual image file to start the target virtual machine.

In some embodiments, the first parameter set comprises at least one of the following: a first parameter associated with the host device, a second parameter associated with the first virtual image file, or a third parameter associated with user information of the client device.

In some embodiments, the apparatus 600 further includes a first key negotiating module configured to negotiate, via the trusted execution environment component, a first session key with the client device, wherein the decryption key is encrypted with the first session key.

In some embodiments, the apparatus 600 further includes a first authentication information sending module, configured to send, to the client device, first authentication information for authenticating the host device, the first authentication information comprising a public key of the host device for communication with the host device.

Alternatively, in some embodiments, the apparatus 600 further includes a first authentication information sending module, configured to send, to the client device, first authentication information for authenticating the host device, the first authentication information comprising a public key of the host device for negotiating the first session key with the client device.

In some embodiments, the apparatus 600 further includes a memory encryption component configured to encrypt the first virtual image file in a memory via the trusted execution environment component.

In some embodiments, the apparatus 600 further includes a configuration file receiving module configured to receive, from the client device, a configuration file for generating the first virtual image file; and generate the first virtual image file based on the configuration file.

In some embodiments, the apparatus 600 further includes an image file receiving module configured to receive the encrypted first virtual image file from the client device.

In some embodiments, the first virtual image file comprises at least one component configured to be automatically run in response to a start of the target virtual machine, the at least one component comprising at least one of the following: a database component, an authentication component, an encryption and decryption component, and a key setting component.

In some embodiments, the apparatus 600 further includes a second authentication information sending module, configured to, after the target virtual machine is started, send, to the client device via the trusted execution environment component, second authentication information for authenticating the trusted execution environment, wherein the second authentication information comprises at least one key pair for encrypting and decrypting a database operation instruction of the client device.

FIG. 7 is a schematic structural block diagram of a further data processing apparatus 700 according to some embodiments of the present disclosure. The apparatus 700 may be implemented or included in the client device 120. The various modules/components in the apparatus 700 may be implemented by hardware, software, firmware, or any combination thereof.

As shown in FIG. 7, the apparatus 700 includes: a first metric value receiving module 710, configured to receive, from a trusted execution environment component of a host device, a first metric value for describing a target virtual machine hosted on the host device; a second metric value generating module 720, configured to determine, based on a second parameter set, a second metric value for describing a virtual machine expected by a client device; and a decryption key sending module 730, configured to, in response to the second metric value being consistent with the first metric value, sending, to the trusted execution environment component of the host device, a decryption key for decrypting a first virtual image file of the target virtual machine.

In some embodiments, the second parameter set includes at least one of the following: a first parameter associated with the host device, a second parameter associated with the first virtual image file, or a third parameter associated with user information of the client device.

In some embodiments, the apparatus 700 further includes a second session key negotiation module configured to negotiate the first session key with a trusted execution environment component of the host device, wherein the decryption key is encrypted with the first session key.

In some embodiments, the apparatus 700 further includes: a first authentication information receiving module configured to receive, from the host device, first authentication information for authenticating the host device, the first authentication information comprising a public key of the host device for communication with the host device.

Alternatively, in some embodiments, the apparatus 700 further includes a first authentication information receiving module that receive, from the host device, first authentication information for authenticating the host device, the first authentication information comprising a public key of the host device for negotiating the first session key with the client device.

In some embodiments, the apparatus 700 further includes a configuration file sending module configured to send, to the host device, a configuration file for generating the first virtual image file, and generate, at the client device, a first virtual image file corresponding to the configuration file.

In some embodiments, the apparatus 700 further includes an image file sending module configured to send the encrypted virtual image file to the host device.

In some embodiments, the apparatus 700 further includes a second authentication information receiving module, configured to, after the target virtual machine is started, receive, from the trusted execution environment component of the host device, second authentication information for authenticating the trusted execution environment, wherein the second authentication information comprises at least one key pair for encrypting and decrypting a data base operation instruction of the client device.

Figure 8:
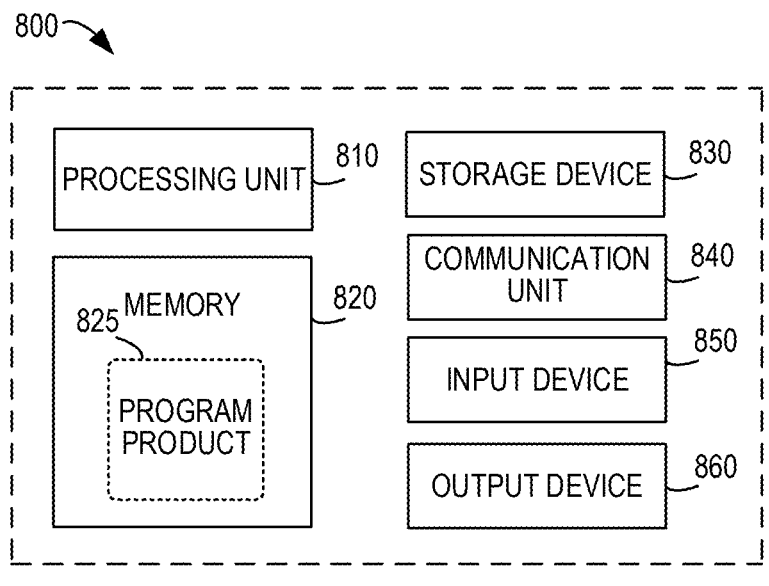
FIG. 8 illustrates a block diagram of an electronic device in which one or more embodiments of the present disclosure may be implemented.

FIG. 8 illustrates a block diagram of an electronic device 800 capable of implementing one or more embodiments of the present disclosure. It should be understood that the electronic device 800 shown in FIG. 8 is merely for example and should not constitute any limitation on the function and scope of the embodiments described herein. The electronic device 800 shown in FIG. 8 may be configured to implement the client device 120 of FIG. 1A.

As shown in FIG. 8, the electronic device 800 is in the form of a general-purpose electronic device or a computing device. Components of the electronic device 800 may include, but are not limited to, one or more processors or processing units 810, a memory 820, a storage device 830, one or more communication units 840, one or more input devices 850, and one or more output devices 860. The processing unit 810 may be an actual or virtual processor and capable of performing various processes according to programs stored in the memory 820. In multiprocessor systems, multiple processing units execute computer-executable instructions in parallel to improve parallel processing capabilities of electronic device 800.

The electronic device 800 typically includes a plurality of computer storage media. Such media may be any available media accessible by the electronic device 800, including, but not limited to, volatile and non-volatile media, removable and non-removable media. The memory 820 may be volatile memory (e.g., registers, caches, random access memory (RAM)), non-volatile memory (e.g., read-only memory (ROM), electrically erasable programmable read-only memory (EEPROM), flash memory), or some combination thereof. Storage device 830 may be a removable or non-removable medium and may include a machine-readable medium, such as a flash drive, magnetic disk, or any other medium, which may be capable of storing information and/or data (for example, the training data for training) and may be accessed within electronic device 800.

The electronic device 800 may further include additional removable/non-removable, volatile/non-volatile storage media. Although not shown in FIG. 8, a disk drive for reading or writing from a removable, nonvolatile magnetic disk (e.g., a "floppy disk") and an optical disk drive for reading or writing from a removable, nonvolatile optical disk may be provided. In these cases, each drive may be connected to a bus (not shown) by one or more data media interfaces. The memory 820 may include a computer program product 825 having one or more program modules configured to perform various methods or actions of various embodiments of the disclosure.

The communications unit 840 implements communications with other electronic devices over a communications medium. Additionally, the functionality of components of the electronic device 800 may be implemented in a single computing cluster or multiple computing machines capable of communicating over a communication connection. Thus, the electronic device 800 may operate in a networked environment using logical connections with one or more other servers, network personal computers (PCs), or another network node.

The input device 850 may be one or more input devices, such as a mouse, a keyboard, a trackball, or the like. The output device 860 may be one or more output devices, such as a display, a speaker, a printer, or the like. The electronic device 800 may also communicate with one or more external devices (not shown) through the communication unit 840 as needed, external devices such as storage devices, display devices, etc., communicate with one or more devices that enable a user to interact with the electronic device 800, or communicate with any device (e.g., a network card, a modem, etc.) that enables the electronic device 800 to communicate with one or more other electronic devices. Such communication may be performed via an input/output (I/O) interface (not shown).

According to example implementations of the disclosure, there is provided a computer-readable storage medium having computer-executable instructions stored thereon, wherein the computer-executable instructions are executed by a processor to implement the method described above. According to example implementations of the disclosure, a computer program product is further provided, the computer program product being tangibly stored on a non-transitory computer-readable medium and including computer-executable instructions, the computer-executable instructions being executed by a processor to implement the method described above.

Aspects of the disclosure are described herein with reference to flowcharts and/or block diagrams of methods, apparatuses, devices, and computer program products implemented in accordance with the disclosure. It should be understood that each block of the flowchart and/or block diagram, and combinations of blocks in the flowcharts and/or block diagrams, may be implemented by computer-readable program instructions.

These computer-readable program instructions may be provided to a processing unit of a general purpose computer, special purpose computer, or other programmable data processing apparatus to produce a machine, such that the instructions, when executed by a processing unit of a computer or other programmable data processing apparatus, produce apparatus to implement the functions/acts specified in the flowchart and/or block(s) in block diagram. These computer-readable program instructions may also be stored in a computer-readable storage medium that cause the computer, programmable data processing apparatus, and/or other devices to function in a particular manner, such that the computer-readable medium storing instructions includes an article of manufacture including instructions to implement aspects of the functions/acts specified in the flowchart and/or block(s) in block diagram.

The computer-readable program instructions may be loaded onto a computer, other programmable data processing apparatus, or other devices, such that a series of operational steps are performed on a computer, other programmable data processing apparatus, or other devices to produce a computer-implemented process such that the instructions executed on a computer, other programmable data processing apparatus, or other devices implement the functions/acts specified in the flowchart and/or block(s) in block diagram.

The flowchart and block diagrams in the figures show architecture, functionality, and operation of possible implementations of systems, methods, and computer program products according to various implementations of the disclosure. In this regard, each block in the flowchart or block diagram may represent a module, program segment, or portion of an instruction that includes one or more executable instructions for implementing the specified logical function. In some alternative implementations, the functions noted in the blocks may also occur in a different order than noted in the figures. For example, two consecutive blocks may actually be performed substantially in parallel, which may sometimes be performed in the reverse order, depending on the functionality involved. It is also noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various implementations of the disclosure have been described above, which are exemplary, not exhaustive, and are not limited to the implementations disclosed. Many modifications and variations will be apparent to those of ordinary skill in the art without departing from the scope and spirit of the various implementations illustrated. The selection of the terms used herein is intended to best explain the principles of the implementations, the practical application, or improvements to the technology in the marketplace, or to enable others of ordinary skill in the art to understand the various implementations disclosed herein.

What is claimed is:

1. A data processing method based on a trusted execution environment, comprising:

determining, via a trusted execution environment component of a host device and based on a first parameter set, a first metric value for describing a target virtual machine hosted on the host device;

sending the first metric value to a client device via the trusted execution environment component of the host device;

receiving, from the client device via the trusted execution environment component, a decryption key for decrypting a first virtual image file of the target virtual machine; and running, based on the decryption key, the first virtual image file to start the target virtual machine, wherein the decryption key is sent by the client device to the trusted execution environment component of the host device in response to a second metric value being consistent with the first metric value, wherein the client device determines, based on a second parameter set, the second metric value for describing a virtual machine expected by the client device, wherein the first parameter set corresponds to the second parameter set.

2. The method of claim 1, wherein the first parameter set comprises at least one of:

a first parameter associated with the host device, a second parameter associated with the first virtual image file, or a third parameter associated with user information of the client device.

3. The method of claim 1, further comprising: negotiating, via the trusted execution environment component, a first session key with the client device, wherein the decryption key is encrypted with the first session key.

4. The method of claim 3, further comprising:

sending, to the client device, first authentication information for authenticating the host device, the first authentication information comprising a public key of the host device for negotiating the first session key with the client device.

5. The method of claim 1, further comprising:

encrypting the first virtual image file in a memory via the trusted execution environment component.

6. The method of claim 1, further comprising:

receiving, from the client device, a configuration file for generating the first virtual image file; and generating the first virtual image file based on the configuration file.

7. The method of claim 1, wherein the first virtual image file comprises at least one component configured to be automatically run in response to a start of the target virtual machine, the at least one component comprising at least one of:

a database component, an authentication component, an encryption and decryption component, or a key setting component.

8. The method of claim 1, further comprising:

after the target virtual machine is started, sending, to the client device via the trusted execution environment component, second authentication information for authenticating the trusted execution environment, wherein the second authentication information comprises at least one key pair for encrypting and decrypting a database operation instruction of the client device.

9. A data processing method based on a trusted execution environment, comprising:

receiving, at a client device and from a trusted execution environment component of a host device, a first metric value for describing a target virtual machine hosted on the host device, wherein the first metric value is determined based on a first parameter set via the trusted execution environment component of the host device;

determining, based on a second parameter set, a second metric value for describing a virtual machine expected by the client device; and in response to the second metric value being consistent with the first metric value, sending, to the trusted execution environment component of the host device, a decryption key for decrypting a first virtual image file of the target virtual machine, wherein the first parameter set corresponds to the second parameter set.

10. The method of claim 9, wherein the second parameter set comprises at least one of:

a first parameter associated with the host device, a second parameter associated with the first virtual image file, or a third parameter associated with user information of the client device.

11. The method of claim 10, further comprising:

after the target virtual machine is started, receiving, from the trusted execution environment component of the host device, second authentication information for authenticating the trusted execution environment, wherein the second authentication information comprises at least one key pair for encrypting and decrypting a data base operation instruction of the client device.

12. An electronic device, comprising:

at least one processor; and at least one memory coupled to the at least one processor and storing instructions for execution by the at least one processor, the instructions, when executed by the at least one processor, causing the electronic device to perform acts comprising:

determining, via a trusted execution environment component of a host device and based on a first parameter set, a first metric value for describing a target virtual machine hosted on the host device;

sending the first metric value to a client device via the trusted execution environment component of the host device;

receiving, from the client device via the trusted execution environment component, a decryption key for decrypting a first virtual image file of the target virtual machine; and running, based on the decryption key, the first virtual image file to start the target virtual machine, wherein the decryption key is sent by the client device to the trusted execution environment component of the host device in response to a second metric value being consistent with the first metric value, wherein the client device determines, based on a second parameter set, the second metric value for describing a virtual machine expected by the client device, wherein the first parameter set corresponds to the second parameter set.

13. The electronic device of claim 12, wherein the first parameter set comprises at least one of:

a first parameter associated with the host device, a second parameter associated with the first virtual image file, or a third parameter associated with user information of the client device.

14. The electronic device of claim 12, wherein the acts further comprise: negotiating, via the trusted execution environment component, a first session key with the client device, wherein the decryption key is encrypted with the first session key.

15. The electronic device of claim 13, wherein the acts further comprise: sending, to the client device, first authentication information for authenticating the host device, the first authentication information comprising a public key of the host device for negotiating a first session key with the client device.

16. The electronic device of claim 12, wherein the acts further comprise:

encrypting the first virtual image file in a memory via the trusted execution environment component.

17. The electronic device of claim 12, wherein the acts further comprise:

receiving, from the client device, a configuration file for generating the first virtual image file; and generating the first virtual image file based on the configuration file.

18. The electronic device of claim 12, wherein the first virtual image file comprises at least one component configured to be automatically run in response to a start of the target virtual machine, the at least one component comprising at least one of:

a database component, an authentication component, an encryption and decryption component, or a key setting component.

19. The electronic device of claim 12, wherein the acts further comprise:

after the target virtual machine is started, sending, to the client device via the trusted execution environment component, second authentication information for authenticating the trusted execution environment, wherein the second authentication information comprises at least one key pair for encrypting and decrypting a database operation instruction of the client device.

* * * * *